United States Patent
Fajardo Sanchez et al.

(10) Patent No.: US 11,691,414 B2
(45) Date of Patent: Jul. 4, 2023

(54) SELECTIVE ASSIGNMENT OF PRINT DATA TO CALIBRATION TABLES IN ACCORDANCE WITH SUBSTRATE ADVANCEMENT SKEW

(71) Applicant: Hewlett-Packard Development Company, L.P., Spring, TX (US)

(72) Inventors: Carlos Fajardo Sanchez, Sant Cugat del Valles (ES); Albert Serra Monner, Sant Cugat del Valles (ES); Esteve Tarrago Sanchis, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 57 days.

(21) Appl. No.: 17/530,652

(22) Filed: Nov. 19, 2021

(65) Prior Publication Data
US 2023/0158793 A1 May 25, 2023

(51) Int. Cl.
*B41J 29/393* (2006.01)
*B41J 2/045* (2006.01)
*G06K 15/10* (2006.01)
*B41J 2/155* (2006.01)
*G06K 15/02* (2006.01)

(52) U.S. Cl.
CPC ....... *B41J 2/04505* (2013.01); *B41J 2/04586* (2013.01); *B41J 2/155* (2013.01); *G06K 15/027* (2013.01); *G06K 15/102* (2013.01)

(58) Field of Classification Search
CPC .. B41J 29/393; B41J 29/38; B41J 2029/3935; B41J 2/2132; B41J 2/2135; B41J 2/2146; B41J 11/42; B41J 2/04505
See application file for complete search history.

(56) References Cited

U.S. PATENT DOCUMENTS

2006/0132528 A1* 6/2006 Ou .......................... B41J 29/393
347/19
2007/0247490 A1* 10/2007 Sheahan .............. B41J 2/04541
347/42

* cited by examiner

*Primary Examiner* — Julian D Huffman

(57) ABSTRACT

Print data is organized over rows and columns. The columns of each row are selectively assigned to calibration tables respectively corresponding to printheads of a pagewide array in accordance with a substrate advancement skew relative to the pagewide array. The calibration tables are applied to the columns of each row respectively assigned to the calibration tables. The columns of each row to which the calibration tables have been applied are printed using the printheads respectively corresponding to the calibration tables.

15 Claims, 7 Drawing Sheets

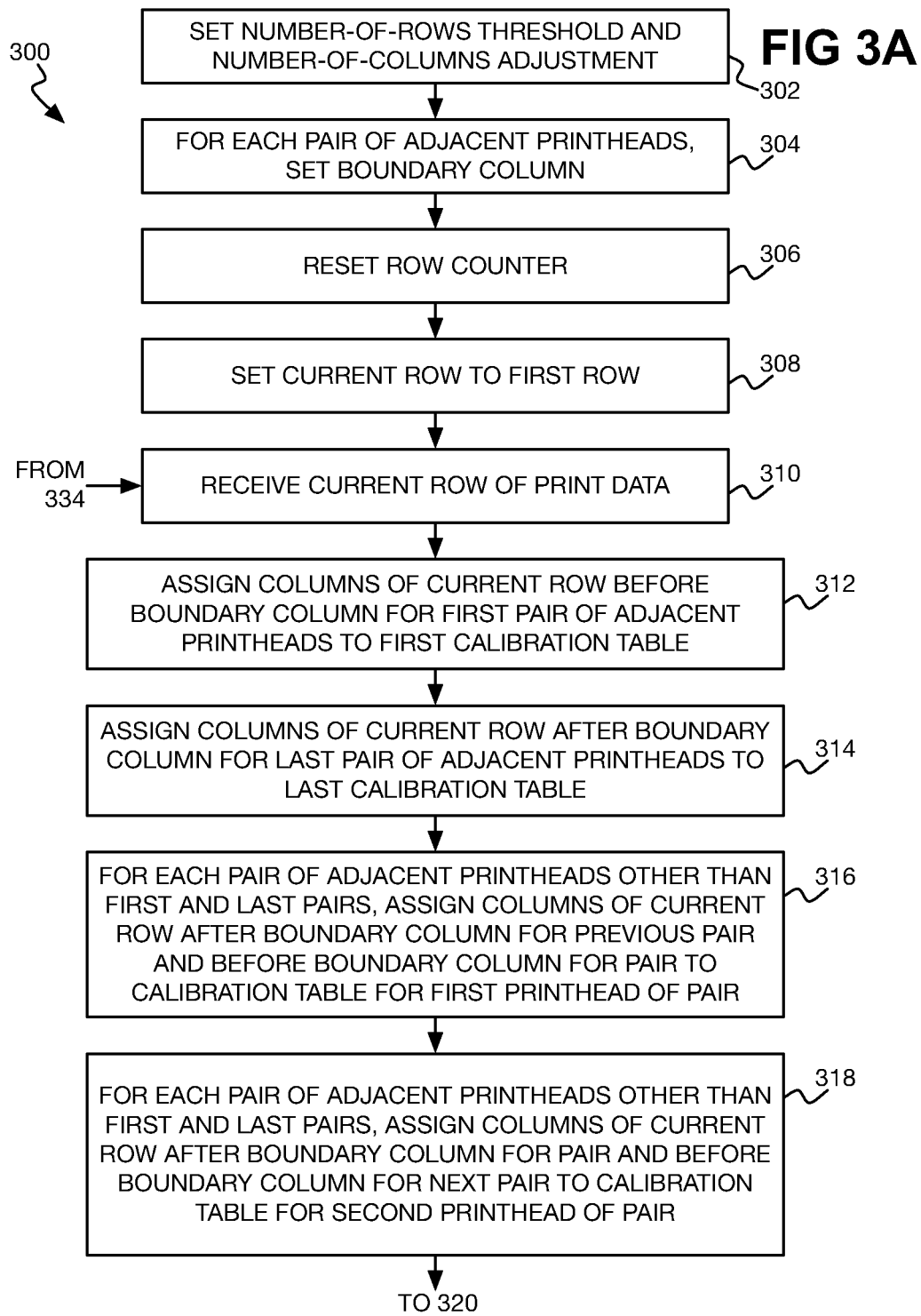

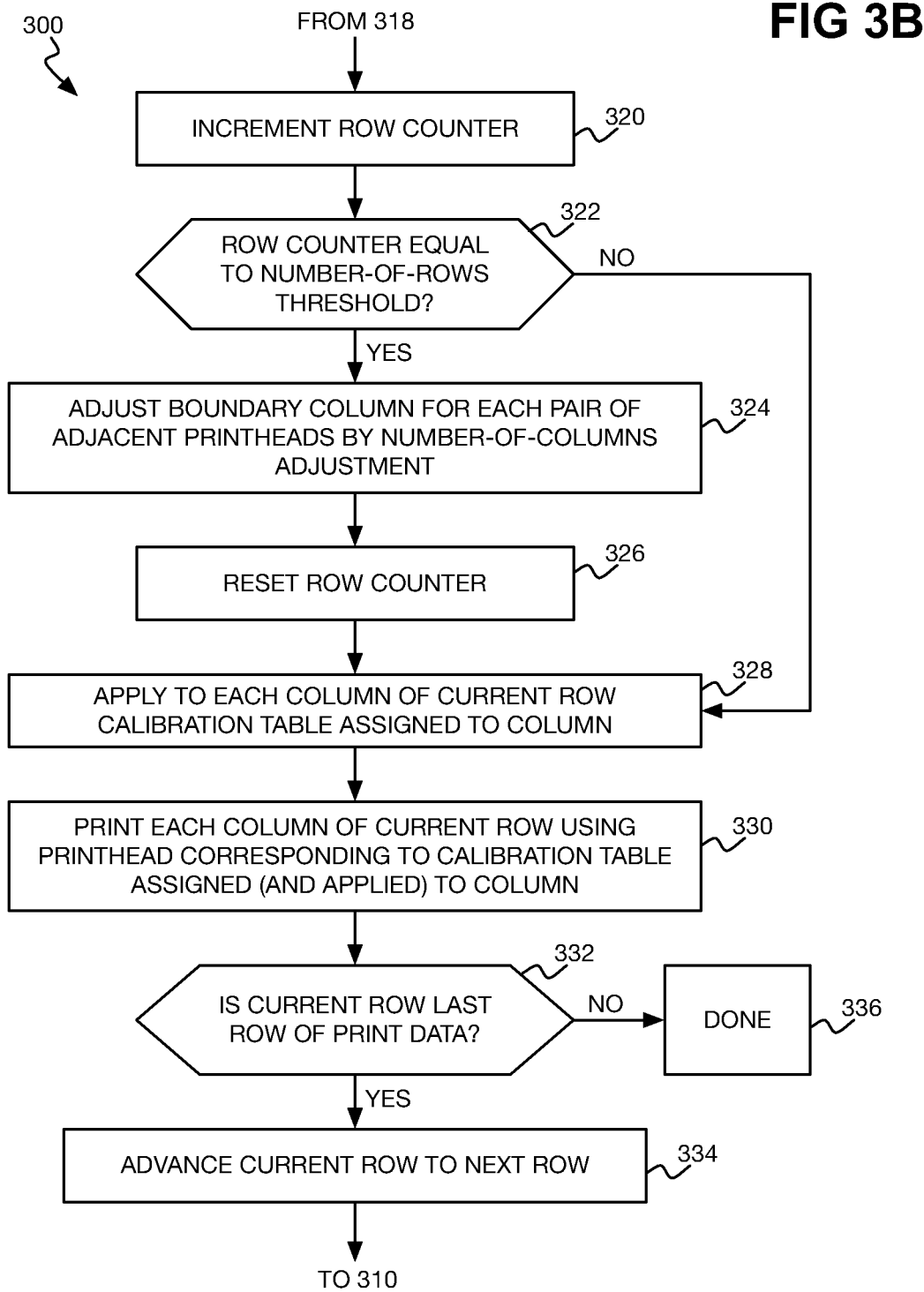

SELECTIVE ASSIGNMENT OF PRINT DATA TO CALIBRATION TABLES IN ACCORDANCE WITH SUBSTRATE ADVANCEMENT SKEW

BACKGROUND

Printing devices output print material onto a print substrate to form images on the print substrate. Some printing devices eject fluid, such as ink, onto a substrate, such as paper, to form the images. Such fluid-ejection devices, which can include inkjet-printing devices, may operate in one of two ways.

First, a fluid-ejection device may have a scanning carriage on which one or multiple fluid-ejection printheads are disposed. A print substrate is advanced under the carriage and then remains stationary as the carriage scans back and forth over a current swath of the substrate to eject fluid onto the swath. The substrate is then advanced to the next swath onto which fluid is to be ejected.

Second, a fluid-ejection device may employ a print bar on which a pagewide array (PWA) of fluid-ejection printheads is disposed. Such a PWA of printheads can simultaneously eject fluid onto entire swaths of a print substrate as the substrate advances under the print bar. The print bar therefore does not have to scan back and forth over a current swath of the substrate, and printing occurs more quickly.

BRIEF DESCRIPTION OF THE DRAWINGS

FIGS. 3A and 3B are flowcharts of an example method for selectively assigning print data to calibration tables corresponding to a PWA of printheads of a printing device and printing of the print data by the printheads after application of the calibration tables.

DETAILED DESCRIPTION

As noted in the background, a printing device can include a pagewide array (PWA) of printheads that print on swaths of a print substrate as the substrate is advanced under the print bar. The PWA of printheads of such a printing device thus is and remains stationary while printing occurs, in comparison to a printing device that employs a scanning carriage that scans across a current swath of a print substrate to print on the swath as the substrate temporarily remains stationary. The PWA is nominally perpendicular to the direction in which the print substrate advances under or past the printheads during printing.

However, in actuality, due to manufacturing tolerances and other reasons, the PWA of printheads of a printing device may purposefully or inadvertently deviate, or skew, from true perpendicular to the direction of substrate advancement. Deviation of the PWA from true perpendicular to the substrate advancement direction can affect the quality of the images printed by the printing device. For instance, calibration tables corresponding to the printheads and which differ by printhead may be incorrectly applied. Such calibration tables can include closed-loop calibration (CLC) tables compensating for different drop weights of the printheads.

For example, print data may be organized over rows and columns. Because the PWA is nominally perpendicular to the direction of print substrate advancement, the same columns of print data may be assigned the same calibration tables, regardless of row. The calibration table assigned and applied to a column of print data is that which corresponds to the printhead expected to print the column, under the assumption that there is no substrate advancement skew relative to the PWA. Because in actuality there may be skew, the calibration table for a printhead may be applied to a column of print data that is actually printed by a neighboring printhead, for a given row of print data. Since the calibration tables can differ by printhead, print defects in the form of visible banding artifacts may occur.

Techniques described herein alleviate these issues. The columns of each row of print data are selectively assigned to calibration tables respectively corresponding to the printheads of the PWA in accordance with a substrate advancement skew relative to the PWA. Therefore, the calibration table assigned and applied to a column of print data is that which corresponds to the printhead that actually prints the column, and is row-dependent. The techniques thus compensate for skew in calibration table application to print data, reducing if not eliminating print defects such as visible banding artifacts that otherwise may occur.

Figure 1A:
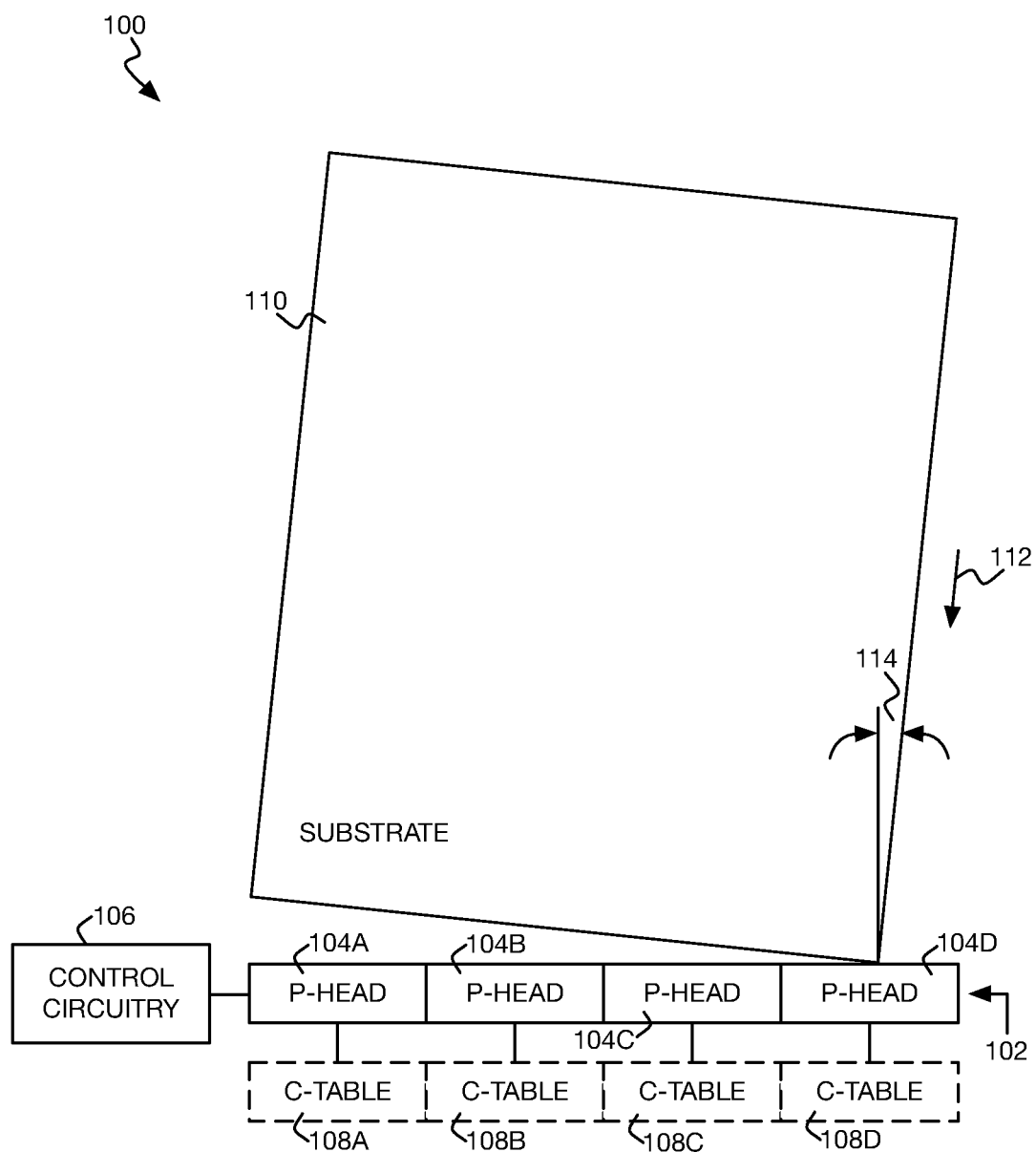
FIGS. 1A and 1B are diagrams of an example printing device having a pagewide array (PWA) of printheads.
Figure 1B:
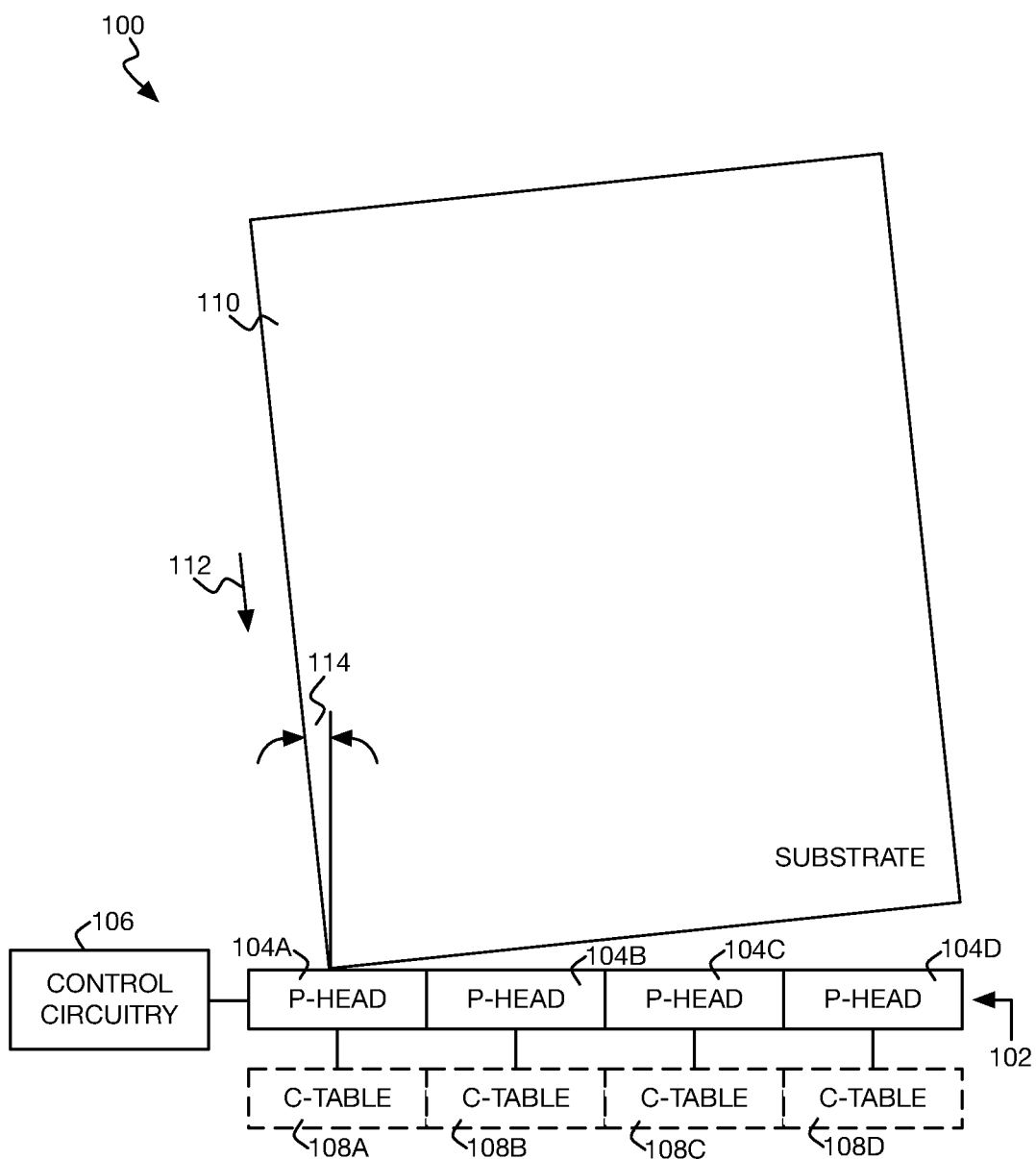

FIGS. 1A and 1B are diagrams of an example printing device 100 having a PWA 102 of printheads 104A, 104B, 104C, and 104D, which are collectively referred to as the printheads 104. In the example, there are four printheads 104. More generally, however, there are at least two printheads 104. For instance, there may be just two printheads 104, or there may be more than two printheads 104, including three printheads 104, four printheads 104 as in the example, or more than four printheads 104.

The printing device 100 further includes control circuitry 106. The control circuitry 106 may be considered as including a processor and memory. The processor and memory may be integrated within an application-specific integrated circuit (ASIC) in the case in which the processor is a special-purpose processor. The processor may instead be a general-purpose processor, such as a central processing unit (CPU), in which case the memory may be a separate semiconductor or other type of volatile or non-volatile memory.

The control circuitry 106 selectively applies calibration tables 108A, 108B, 108C, 108D, which are collectively referred to as the calibration tables 108, and which respectively correspond to the printheads 104. That is, the calibration table 108A corresponds to the printhead 104A, the calibration table 108B corresponds to the printhead 104B, and so on. The control circuitry 106 selectively applies the calibration tables 108 to print data prior to the printheads 104 printing the print data on a print substrate 110 as the substrate 110 advances under the PWA 102 in the substrate advancement direction 112.

The print substrate 110 has a skew 114 relative to the PWA 102 in advancing in the substrate advancement direction 112, which is referred to as the substrate advancement skew 114. In FIG. 1A, the skew 114 is clockwise, in that the substrate 110 is rotated clockwise relative to the PWA 102. By comparison, in FIG. 1B, the skew 114 is counterclockwise, in that the substrate 110 is rotated counterclockwise relative to the PWA 102.

The substrate advancement skew 114 relative to the PWA 102 may be specified in a variety of different ways. The skew 114 may be specified by a skew angle from which the PWA 102 deviates from true perpendicular to the substrate advancement direction 112. The skew 114 may be specified by a number of millimeters, either positive or negative, by which the substrate 110 shifts perpendicular to the PWA 102 for every number of meters of substrate advancement in the direction 112. For instance, a skew 114 of 0.004 degrees, which is just over $\frac{1}{100,000}$ of a full circle, can result in a deviation of three pixels over a one-meter swath.

The control circuitry 106 specifically assigns and applies to the print data the calibration tables 108 corresponding to the printheads 104 that will actually print the print data on the print substrate 110 as the substrate 110 advances under the PWA 102 in the substrate advancement direction 112. That is, the control circuitry 106 assigns and applies the calibration tables 108 to the print data in a manner that compensates for the substrate advancement skew 114 relative to the PWA 102. Such skew-compensating calibration table application ensures that print defects such as banding artifacts that would otherwise result from the skew 114 do not in fact occur, or at least are reduced.

Figure 2A:
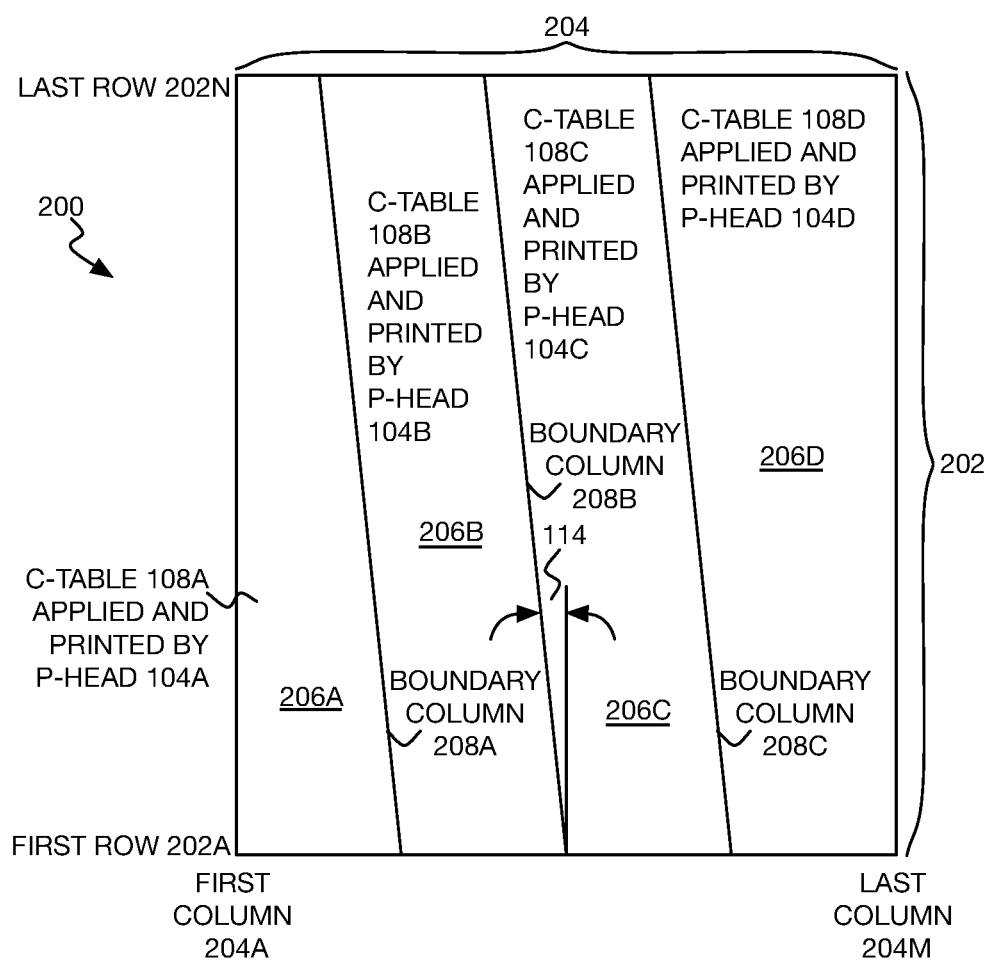
FIGS. 2A and 2B are diagrams depicting example selective assignment of print data to calibration tables corresponding to a PWA of printheads of a printing device.
Figure 2B:
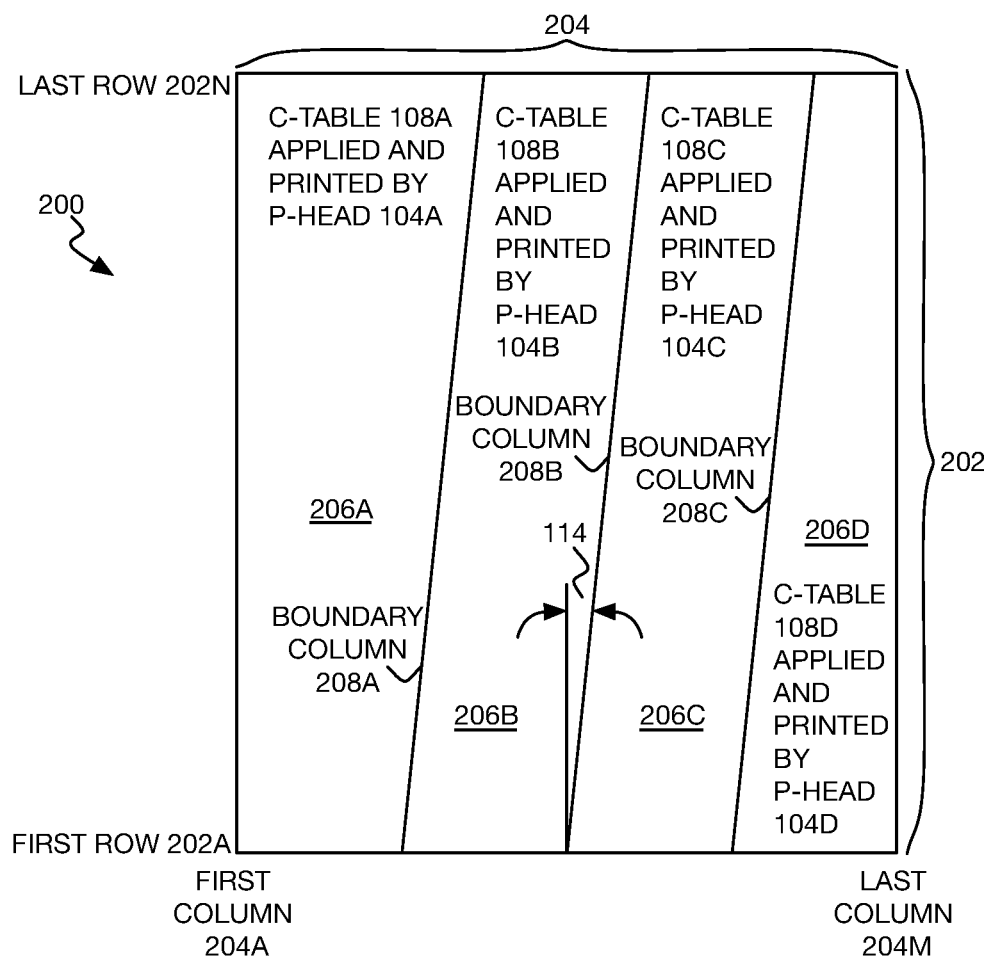

FIGS. 2A and 2B show example selective assignment of print data 200 to the calibration tables 108 corresponding to the printheads 104 of the printing device 100. FIG. 2A corresponds to the clockwise skew 114 of FIG. 1A, whereas FIG. 2B corresponds to the counterclockwise skew 114 of FIG. 1B. In both figures, the print data 200 is organized over rows 202, from a first row 202A to a last row 202N, and columns 204, from a first column 204A to a last column 204M. The number of rows 202 can be greater than, equal to, or less than the number of columns 204.

The print data 200 is divided into portions 206A, 206B, 206C, and 206D, which are collectively referred to as the portions 206, and which respectively correspond to the printheads 104 that print and to the calibration tables 108 that are applied to the portions 206. The calibration table 108A is thus applied to the portion 206A and the portion 206A is printed by the printhead 104A, and the calibration table 108B is applied to the portion 206B and the portion 206B is printed by the printhead 104B. Similarly, the calibration table 108C is applied to the portion 206C and the portion 206C is printed by the printhead 104C, and the calibration table 108D is applied to the portion 206D and the portion 206D is printed by the printhead 104D.

Adjacent portions 206 are divided by boundary columns 208A, 208B, and 208C, which are collectively referred to as the boundary columns 208. The boundary column 208A divides the adjacent portions 206A and 206B. The boundary column 208B divides the adjacent portions 206B and 206C. The boundary column 208C divides the adjacent portions 206C and 206D. The number of boundary columns 208 is thus equal to one less than the number of printheads 104 (and therefore also to the number or calibration tables 108). In the example, because there are four printheads 104 and four calibration tables 108, there are three boundary columns 208.

From the first row 202A to the last row 202N, the boundary columns 208 each rotate by the same magnitude but in the opposite direction as the media advancement skew 114. For instance, whereas the media advancement skew 114 relative to the PWA 102 in FIG. 1A is clockwise, the boundary columns 208 of FIG. 2A correspondingly rotate by the same magnitude but counterclockwise. Similarly, whereas the skew 114 relative to the PWA 102 in FIG. 1B is counterclockwise, the boundary columns 208 of FIG. 2B correspondingly rotate by the same magnitude but clockwise.

Rotation of the boundary columns 208 from the first row 202A to the last row 202N ensures that the calibration table 108 applied to each column 204 corresponds to the printhead 104 that actually prints the column 204 in question for each row 202. The print data 200 is printed on the substrate 110 on a row-by-row basis, starting with the first row 202A. In the example, each printhead 104 prints the same number of columns 204 of print data 200 in the first row 202A, and thus the boundary columns 208 divide the first row 202A into equal numbers of columns 204.

However, as the substrate 110 advances in the direction 112 and as subsequent rows 202 are printed, in FIG. 2A, fewer columns 204 are printed by the printhead 104A and more columns 204 are printed by the printhead 104D, as a result of the clockwise skew 114 in FIG. 1A. Therefore, the calibration table 108A is correspondingly applied to fewer columns 204 and the calibration table 108D is correspondingly applied to more columns 204. Conversely, in FIG. 2B, more columns 204 are printed by the printhead 104A and fewer columns 204 are printed by the printhead 104D, as a result of the counterclockwise skew 114 in FIG. 1B. Therefore, the calibration table 108A is correspondingly applied to more columns 204 and the calibration table 108D is correspondingly applied to fewer columns 204.

FIGS. 2A and 2B thus illustrate how print data 200 is selectively assigned to the calibration tables 108 in accordance with the substrate advancement skew 114 relative to the PWA 102. For each row 202, the columns 204 are selectively assigned to the calibration tables 108 corresponding to the printheads 104 that will actually print the print data 200, and therefore account for the skew 114. The rotation of the boundary columns 208 in accordance with the skew 114 ensures that the print data 200 is divided into portions 206 accurately corresponding to which printhead 104 will print each portion 206 and which calibration table 108 is to be applied to that portion 206.

In the example, the boundary columns 208 linearly rotate from the first row 202A to the last row 202N in accordance with the skew 114. However, such rotation may not be linear. For instance, the boundary columns 208 may rotate in stepwise fashion, such that for every specified number of rows 202, the boundary columns 208 shift to the left in FIG. 2A and to the right in FIG. 2B by a specified number of columns 204. That is, after the first X number of rows 202, the boundary columns 208 may shift by Y number of columns 204; after the next X number of rows 202, the boundary columns 208 may again shift by Y number of columns 204, and so on. The smaller the skew 114 is, the larger the X number of rows 202 is in relation to the Y number of columns 204 in this example.

FIGS. 3A and 3B show an example method 300 for selectively assigning print data 200 to calibration tables 108 corresponding to a PWA 102 of printheads 104 of a printing device 100 and printing of the print data 200 by the printheads 104 after application of the calibration tables 108. The method 300 can be performed by the control circuitry 106 of the printing device 100. The method 300 can be implemented as program code stored on a non-transitory computer-readable data storage medium, such as a memory, storing program code and executable by a processor, such as that of the control circuitry 106.

The method 300 includes setting a number-of-rows threshold and a number-of-columns adjustment according to the substrate advancement skew 114 relative to the PWA 102

(302). The number-of-columns adjustment specifies the number of columns 204 by which the boundary columns 208 are to shift each time the print substrate 110 has advanced in the direction 112 by a number of rows 202 equal to the number-of-rows threshold. The number-of-rows threshold is positive. The number-of-columns adjustment is negative for a clockwise skew 114 and positive for a counterclockwise skew 114 where the columns 204 span from a first column 204A to a last column 204M from left to right.

The magnitude of the number-of-columns adjustment divided by the magnitude of the number-of-rows threshold is equal to the tangent of the angle of the skew 114. The number-of-columns adjustment and the number-of-rows threshold may be whole numbers. In the example, the number-of-columns adjustment and the number-of-rows threshold are each specified once, in the case in which the substrate advancement skew 114 is static (and thus linear). However, in the case in which the skew 114 is dynamic (and thus curved), the number-of-columns adjustment and the number-of-rows threshold may each be periodically specified, as the skew 114 changes, for instance.

The method 300 includes, for each pair of adjacent printheads 104, initially setting a corresponding boundary column 208 (304). Specifically, a pair of adjacent printheads 104 includes a first printhead 104 and a second printhead 104. The boundary column 208 corresponding to the pair is set to the column 204 before which the first printhead 104 prints a preceding column 204 of the first row 202A of print data 200 and after which the second printhead 104 prints a succeeding column 204.

The number of columns 204 of the first row 202A of print data 200 to be printed by a pair of adjacent printheads 104 may be even or odd in number. If the number of columns 204 is even, then the number of columns 204 to be printed by the first printhead 104 is equal to the number of columns 204 to be printed by the second printhead 104. The boundary column 208 is assigned as the last column 204 in the first row 202A to be printed by the first printhead 104 or as the first column 204 in the first row 202A to be printed by the second printhead 104. In the former case, the boundary column 208 itself is thus printed by the first printhead 104, whereas in the latter case, the boundary column 208 is printed by the second printhead 104.

If the number of columns 204 of the first row 202A to be printed by a pair of adjacent printheads 104 is odd, then the number of columns 204 to be printed by the first printhead 104 is one more or one less than the number of columns 204 to be printed by the second printhead 104. In the former case, the boundary column 208 is assigned as the last column 204 in the first row 202A to be printed by the first printhead 104 and is printed by the first printhead 104. In the latter case, the boundary column 208 is assigned as the first column 204 in the first row 202A to be printed by the second printhead 104 and is printed by the second printhead 104.

For example, the pair of adjacent printheads 104B and 104C include a first printhead 104B and a second printhead 104C. The corresponding boundary column 208B is set such that the printhead 104B prints the column 204 in the first row 202A immediately before the boundary column 208B and the printhead 104C prints the column 204 in the first row 202A immediately after the boundary column 208B. The boundary column 208B itself may be assigned to either the printhead 104B or 104C.

The method 300 includes resetting a row counter (306), which is used to track each time the print substrate 110 has been advanced by a number of rows 202 equal to the number-of-rows threshold and such a number of rows 202 have been printed. The method 300 also includes setting a current row 202 to the first row 202A of print data 200 to be printed (308). In the example, the method 300 includes then receiving the current row 202 of print data 200, from the first column 204A to the last column 204M (310). However, in another implementation, all the rows 202 of print data 200 may be received at the same time. That print data 200 organized over rows 202 and columns 204 is received encompasses both implementations.

The method 300 includes assigning the columns 204 of the current row 202 before the boundary column 208 for the first pair of adjacent printheads 104 to the first calibration table 108 corresponding to the first printhead 104 of the PWA 102 (312). For example, the columns 204 of the current row 202 before the boundary column 208A for the first pair of adjacent printheads 104A and 104B are assigned to the first calibration table 108A corresponding to the first printhead 104A of the PWA 102.

The method 300 includes assigning the columns 204 of the current row 202 after the boundary column 208 for the last pair of adjacent printheads 104 to the last calibration table 108 corresponding to the last printhead 104 of the PWA 102 (314). For example, the columns 204 of the current row 202 after the boundary column 208C for the last pair of adjacent printheads 104C and 104D are assigned to the last calibration table 108D corresponding to the last printhead 104D of the PWA 102.

The method 300 includes, for each pair of adjacent printheads 104 other than the first and last pairs, assigning the columns 204 of the current row 202 after the boundary column 208 for the previous pair and before the boundary column for the pair to the calibration table 108 for the first printhead 104 of the pair (316). For example, for the pair of adjacent printheads 104B and 104C, the columns 204 of the current row 202 after the boundary column 208A for the previous pair of adjacent printheads 104A and 104B and before the boundary column 208B for the pair of adjacent printheads 104B and 104C are assigned to the calibration table 108B corresponding to the first printhead 104B of the pair of adjacent printheads 104B and 104C.

The method 300 includes, for each pair of adjacent printheads 104 other than the first and last pairs, assigning the columns 204 of the current row 202 after the boundary column 208 for the pair and before the boundary column for the next pair to the calibration table 108 for the second printhead 104 of the pair (318). For example, for the pair of adjacent printheads 104B and 104C, the columns 204 of the current row 202 after the boundary column 208B for the pair of adjacent printheads 104B and 104C and before the boundary column 208C for the next pair of adjacent printheads 104C and 104D are assigned to the calibration table 108C corresponding to the second printhead 104C of the pair of adjacent printheads 104C and 104D.

In the case in which there are four printheads 104 and thus four calibration tables 108, there is just one pair of adjacent printheads 104 other than the first and last pairs of adjacent printheads 104. This is because there are three pairs of adjacent printheads 104: the first pair of adjacent printheads 104A and 104B, the second pair of adjacent printheads 104B and 104C, and the third (and last) pair of adjacent printheads 104C and 104D. By comparison, in the case in which there are more than four printheads 104 and thus more than four calibration tables 108, there is more than one pair of adjacent printheads 104 other than the first and last pairs of adjacent printheads 104.

Furthermore, in the case in which there are three printheads 104 and thus three calibration tables 108, there are no pairs of adjacent printheads 104 other than the first and last pairs of adjacent printheads 104. Therefore, parts 316 and 318 of the method 300 are not performed. By comparison, in the case in which there are two printheads 104 and thus two calibration tables 108, there is just one pair of adjacent printheads 104, which is both the first and the last pair of adjacent printheads 104. Therefore, parts 312 and 314 are each performed in relation to this pair, and parts 316 and 318 are not performed.

The method 300 includes incrementing the row counter (320). In response to the row counter becoming equal to the number-of-rows threshold (322), the method 300 includes adjusting the boundary column 208 for each pair of adjacent printheads 104 by the number-of-columns adjustment (324), and resetting the row counter (326). This boundary column adjustment thus ensures that the columns 204 of subsequent rows 202 of print data 200 are selectively assigned to the calibration tables 108 corresponding to the printheads 104 that will actually print the print data 200. Each time a number of rows 202 has been selectively assigned to the calibration tables 108, each boundary column 208 is adjusted.

The method 300 includes applying to each column 204 of the current row 202 of print data 200 the calibration table 108 assigned to that column 204 (328). The method 300 includes then printing each column 204 of the current row 202 of print data using the printhead 104 corresponding to the calibration table 108 assigned (and applied) to that column 204 (330). That is, the printheads 104 of the PWA 102 print the columns 204 of the current row 202 as the print substrate 110 advances under the PWA 102 in the direction 112 and at the skew 114 relative to the PWA 102.

If the current row 202 is the last row 202N of print data 200 (332), the method 300 includes then advancing the current row 202 to the next row 202 of print data (334), and proceeding back to part 310 with respect to this new current row 202. Therefore, in effect, while the current row 202 is not past the last row 202N of print data 200, parts 310 through 334 are performed. Once the last row 202N has been printed, the method 300 is finished (336).

Figure 4:
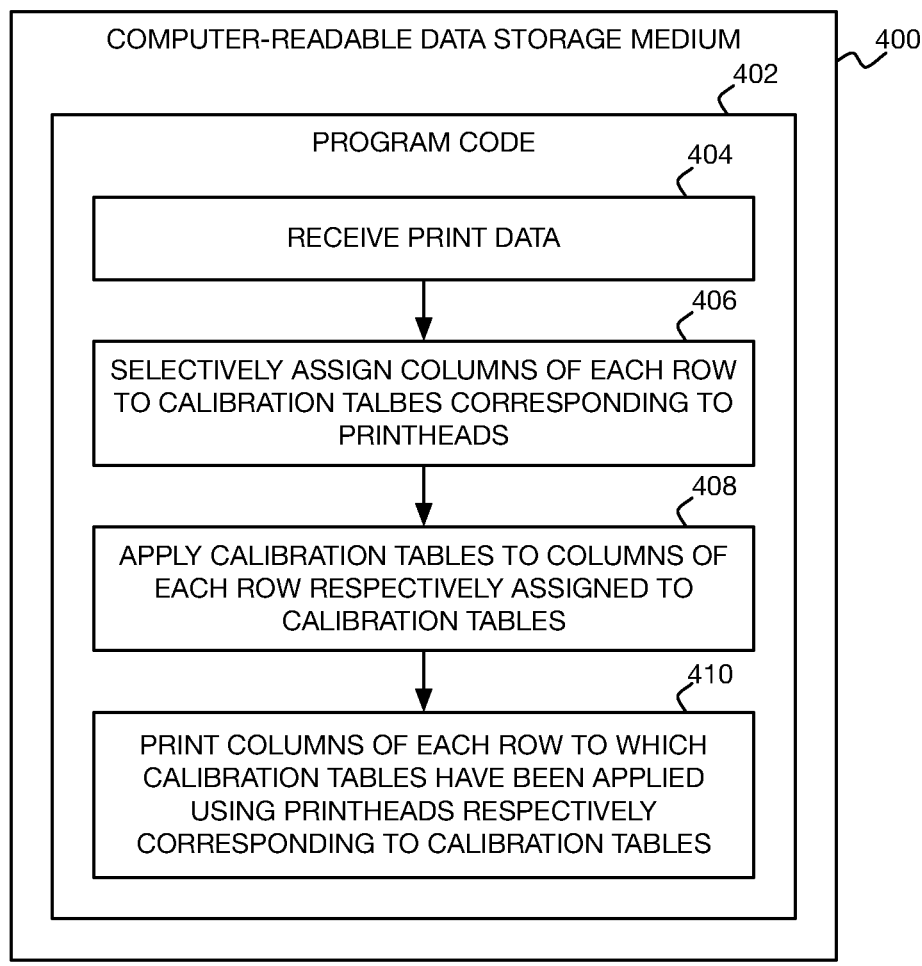
FIG. 4 is a diagram of an example non-transitory computer-readable data storage medium.

FIG. 4 shows an example non-transitory computer-readable data storage medium 400 storing program code 402 executable by a processor, such as that of the control circuitry 106 of the printing device 100, to perform processing. The processing includes receiving print data 200 organized over rows 202 and columns 204 (404). The processing includes selectively assigning the columns 204 of each row 202 to calibration tables 108 respectively corresponding to printheads 104 of a PWA 102 in accordance with a substrate advancement skew 114 relative to the PWA 102 (406).

The processing includes applying the calibration tables 108 to the columns 204 of each row 202 respectively assigned to the calibration tables 108 (408). For example, if there are two calibration tables 108, the first calibration table 108 is applied to the columns 204 of each row 202 assigned to the first calibration table 108, and the second calibration table 108 is applied to the columns 204 of each row 202 assigned to the second calibration table 108.

The processing includes printing the columns 204 of each row 202 to which the calibration tables 108 have been applied using the printheads 104 respectively corresponding to the calibration tables 108 (410). For example, if there are two printheads 104, the columns 204 of each row 202 to which the first calibration table 108 has been applied are printed using the first printhead 104, and the columns 204 of each row 202 to which the second calibration table 108 has been applied are printed using the second printhead 104.

Techniques have been described for selectively assigning print data 200 to calibration tables 108 in accordance with substrate advancement skew 114 relative to a PWA 102 of printheads 104. Therefore, for each row 202 of print data 200, the columns 204 of the print data 200 are assigned to the calibration tables 108 corresponding to the printheads 104 that are to actually print the columns 204, taking into account the skew 114. Print image quality is improved, because for any column 204 of any row 202 of print data 200, the calibration table 108 corresponding to a printhead 104 other than that which will actually print that column 204 of that row 202 is not incorrectly applied.

We claim:

1. A non-transitory computer-readable data storage medium storing program code executable by a processor to perform processing comprising:
   receiving print data organized over rows and columns;
   selectively assigning the columns of each row to first and second calibration tables respectively corresponding to first and second printheads of a pagewide array in accordance with a substrate advancement skew relative to the pagewide array;
   applying the first and second calibration tables to the columns of each row respectively assigned to the first and second calibration tables; and
   printing the columns of each row to which the first and second calibration tables have been applied using the first and second printheads respectively corresponding to the first and second calibration tables.

2. The non-transitory computer-readable data storage medium of claim 1, wherein selectively assigning the columns of each row to the first and second calibration tables in accordance with the substrate advancement skew relative to the pagewide array comprises:
   setting a number-of-rows threshold and a number-of-columns adjustment in accordance with the substrate advancement skew relative to the pagewide array.

3. The non-transitory computer-readable data storage medium of claim 2, wherein selectively assigning the columns of each row to the first and second calibration tables in accordance with the substrate advancement skew relative to the pagewide array further comprises:
   setting a boundary column to a column of the print data before which the first printhead is to print a preceding column of a first row of the print data and after which the second printhead is to print a succeeding column of the first row.

4. The non-transitory computer-readable data storage medium of claim 3, wherein selectively assigning the columns of each row to the first and second calibration tables in accordance with the substrate advancement skew relative to the pagewide array further comprises:
   assigning the columns of each row before the boundary column to the first calibration table and the columns of each row after the boundary column to the second calibration table; and
   each of a plurality of times a number of rows equal to the number-of-rows threshold have been selectively assigned to the first and second calibration tables, adjusting the boundary column by the number-of-columns adjustment.

5. The non-transitory computer-readable data storage medium of claim 3, wherein selectively assigning the columns of each row to the first and second calibration tables in accordance with the substrate advancement skew relative to the pagewide array further comprises:
   resetting a row counter;

setting a current row to a first row of the print data;
while the current row is not past a last row of the print data:
- assigning the columns of the current row before the boundary column to the first calibration table and the columns of the row after the boundary column to the second calibration table;
- incrementing the row counter;
- in response to the row counter becoming equal to the number-of-rows threshold, adjusting the boundary column by the number-of-columns adjustment and resetting the row counter; and
- advancing the current row to a next row.

6. The non-transitory computer-readable data storage medium of claim 2, wherein the number-of-columns adjustment is positive in a case in which the substrate advancement skew relative to the pagewide array results in the first printhead printing more of the columns of a last row of the print data than the second printhead,
and wherein the number-of-columns adjustment is negative in a case in which the substrate advancement skew relative to the pagewide array results in the second printhead printing more of the columns of the last row than the first printhead.

7. The non-transitory computer-readable data storage medium of claim 1, wherein applying the first and second calibration tables to the columns of each row respectively assigned to the first and second calibration tables comprises:
- applying the first calibration table to the columns of each row assigned to the first calibration table; and
- applying the second calibration table to the columns of each row assigned to the second calibration table.

8. The non-transitory computer-readable data storage medium of claim 7, wherein printing the columns of each row to which the first and second calibration tables have been applied using the first and second printheads respectively corresponding to the first and second calibration tables comprises:
- printing the columns of each row to which the first calibration table has been applied using the first printhead; and
- printing the columns of each row to which the second calibration table has been applied using the second printhead.

9. The non-transitory computer-readable data storage medium of claim 1, wherein the first and second calibration tables are closed-loop calibration (CLC) tables compensating for different drop weights of the first and second printheads.

10. A printing device comprising:
a pagewide array including a plurality of printheads; and
control circuitry to:
- selectively assign columns of each of a plurality of rows of print data to a plurality of calibration tables respectively corresponding to the printheads in accordance with a substrate advancement skew relative to the pagewide array;
- applying the calibration tables to the columns of each row respectively assigned to the calibration tables; and
- printing the columns of each row to which the calibration tables have been applied using the printheads respectively corresponding to the calibration tables.

11. The printing device of claim 10, wherein the control circuitry is to selectively assign the columns of each row to the calibration tables in accordance with the substrate advancement skew relative to the pagewide array by:
setting a number-of-rows threshold and a number-of-columns adjustment in accordance with the substrate advancement skew relative to the pagewide array.

12. The printing device of claim 11, wherein the printheads comprises more than two printheads, and the control circuitry is to selectively assign the columns of each row to the calibration tables in accordance with the substrate advancement skew relative to the pagewide array by further:
for each of a plurality of pairs of adjacent printheads of the pagewide array, setting a boundary column to a column of the print data before which a first printhead of the pair is to print a preceding column of a first row of the print data and after which a second printhead of the pair is to print a succeeding column of the first row.

13. The printing device of claim 12, wherein the control circuitry is to selectively assign the columns of each row to the calibration tables in accordance with the substrate advancement skew relative to the pagewide array by further:
- assigning the columns of each row before the boundary column for a first pair of adjacent printheads to a first calibration table corresponding to a first printhead;
- assigning the columns of each row after the boundary column for a last pair of adjacent printheads to a last calibration table corresponding to a last printhead;
- for each pair of adjacent printheads other than the first and last pair, assigning the columns of each row after the boundary column for a previous pair and before the boundary column for the pair to a calibration table corresponding to the first printhead of the pair;
- for each pair of adjacent printheads other than the first and last pair, assigning the columns of each row after the boundary column for the pair and before the boundary column for a next pair to a calibration table corresponding to the second printhead of the pair; and
- each of a plurality of times a number of rows equal to the number-of-rows threshold have been selectively assigned to the calibration tables, adjusting the boundary column for each pair of adjacent printheads by the number-of-columns adjustment.

14. The printing device of claim 12, wherein the control circuitry is to selectively assign the columns of each row to the calibration tables in accordance with the substrate advancement skew relative to the pagewide array by further:
resetting a row counter;
setting a current row to the first row of the print data;
while the current row is not past a last row of the print data:
- assigning the columns of the current row before the boundary column for a first pair of adjacent printheads to a first calibration table corresponding to a first printhead;
- assigning the columns of the current row after the boundary column for a last pair of adjacent printheads to a last calibration table corresponding to a last printhead;
- for each pair of adjacent printheads other than the first and last pair, assigning the columns of the current row after the boundary column for a previous pair and before the boundary column for the pair to a calibration table corresponding to the first printhead of the pair;
- for each pair of adjacent printheads other than the first and last pair, assigning the columns of the current row after the boundary column for the pair and before the boundary column for a next pair to a calibration table corresponding to the second printhead of the pair;

incrementing the row counter;

in response to the row counter becoming equal to the number-of-rows threshold, adjusting the boundary column for each pair of adjacent printheads by the number-of-columns adjustment and resetting the row counter; and advancing the current row to a next row.

15. A method comprising:

receiving print data organized over rows and columns;

setting a number-of-rows threshold and a number-of-columns adjustment in accordance with substrate advancement skew relative to a pagewide array including more than two printheads;

for each of a plurality of pairs of adjacent printheads of the pagewide array, setting a boundary column to a column of the print data before which a first printhead of the pair is to print a preceding column of a first row of the print data and after which a second printhead of the pair is to print a succeeding column of the first row;

resetting a row counter;

setting a current row to a first row of the print data;

while the current row is not past a last row of the print data:

assigning the columns of the current row before the boundary column for a first pair of adjacent printheads to a first calibration table corresponding to a first printhead;

assigning the columns of the current row after the boundary column for a last pair of adjacent printheads to a last calibration table corresponding to a last printhead;

for each pair of adjacent printheads other than the first and last pair, assigning the columns of the current row after the boundary column for a previous pair and before the boundary column for the pair to a calibration table corresponding to the first printhead of the pair;

for each pair of adjacent printheads other than the first and last pair, assigning the columns of the current row after the boundary column for the pair and before the boundary column for a next pair to a calibration table corresponding to the second printhead of the pair;

incrementing the row counter;

in response to the row counter becoming equal to the number-of-rows threshold, adjusting the boundary column for each pair of adjacent printheads by the number-of-columns adjustment and resetting the row counter;

applying to each column of the current row the calibration table assigned to the column; and printing each column of the current row using the printhead corresponding to the calibration table assigned to the column; and advancing the current row to a next row.

* * * * *